Patented Apr. 29, 1952

2,594,556

UNITED STATES PATENT OFFICE 2,594,556

PROCESS FOR THE PURIFICATION OF DERIVATIVES OF PHENOXYACETIC ACID

Gilbert Spencer Hartley, Fulbourne, England, assignor to Pest Control Limited, Bourn, England, a British company No Drawing. Application September 15, 1950, Serial No. 185,145. In Great Britain September 19, 1949

7 Claims. (Cl. 260—521)

1

This invention relates to a process for the purification of phenoxy-acetic acid in a substantially odourless condition.

It is known that various chloro and chloromethyl phenoxy-acetic acids, especially the 2-methyl-4-chloro, the 2.4-dichloro and the 2.4.5-trichloro-phenoxy-acetic acids, in the form of oil solutions of the acids or their esters or water solutions of the sodium or other salts have valuable properties as spraying materials for the control of weeds in agricultural crops, roadside verges, lawns, etc.

A serious disadvantage in the use of these substances as normally produced by commercial methods, especially for their domestic use, is that they have a very persistent and objectionable odour. This odour is due, not to the compounds themselves, but to the corresponding phenols or cresols from which they are manufactured and which persist in the product due to incomplete reaction.

It has been proposed in British Patent No. 592,827 to remove these objectionable traces of such phenols or cresols by steam distillation of the aqueous solutions of the salts of the corresponding phenoxy-acetic acids. It is evident also that a similar result can be obtained by extraction of these solutions with a suitable water-immiscible solvent. The objectionable smell, however, is so persistent that it is still evident when the concentration of free substituted phenols or cresols is reduced as far as is commercially practicable by these methods. It is, therefore, desirable to use a chemical method for destruction of the remaining traces of odorous compounds.

It has been found according to this invention that these chlorinated phenols or cresols in slightly acid, neutral or alkaline solutions in water are rapidly attacked by solutions containing the permanganate ion, being oxidised to compounds which no longer have a strong and objectionable odour. It has been further found that a permanganate solution of sufficient concentration to oxidise the free chlorinated phenols or cresols, acts only very slowly on the corresponding phenoxy-acetic acids or phenoxy acetates.

It is an object of this invention to provide an improved process for the manufacture of substantially odourless derivatives of phenoxy-acetic acid.

It is a further object of this invention to provide a process for treating crude derivatives of phenoxy-acetic acid with a permanganate to remove odorous compounds without substantially affecting the phenoxy-acetic acid derivative.

Further objects of the invention will become apparent from the following description.

According to the process of the present invention a slightly acid, neutral or alkaline solution of a crude chlorophenoxy-acetic acid or a crude chloro-methyl-phenoxy-acetic acid or a salt or ester of such a compound, is treated with sufficient of a permanganate to remove the odour while leaving the phenoxy-acetic acid derivative substantially unaffected.

The term "crude" as used herein refers to a compound containing the odorous chlorinated phenols or cresols.

Preferably, before the treatment with the permanganate, the greater part of the odorous compound is removed by extraction of a slightly acidified solution with a suitable water-immiscible solvent.

Preferably the permanganate is potassium permanganate or sodium permanganate and the treatment therewith is preferably effected at or about room temperature.

During the oxidation of the odorous compound by the permanganate under the slightly acid, neutral or alkaline conditions employed, a precipitate of insoluble manganese dioxide is formed. There is, therefore, no substantial loss of the desired compounds as insoluble manganous salts. The precipitate also contains an insoluble brown organic polymerisation product arising from the action of the permanganate on the phenol. If the deodorised solution of the products of the reaction by which phenoxy-acetate is formed is to be used commercially as such we prefer to remove this precipitate of manganese dioxide by filtration, sedimentation under gravity or preferably centrifuging.

Alternatively, it may be advantageous, after removal of the odorous substances, to precipitate the free phenoxy-acetic acids from the reaction solution in order to re-dissolve them in alkali or to subject them to further chemical processing. Where they are re-dissolved in alkali this has the advantage that a more concentrated solution can be made because the product is substantially free from the alkali chloride which is a normal constituent of the reaction product. When this precipitation of the free acids is carried out the manganese dioxide can be more conveniently removed by chemical means than by the physical means above mentioned. The reaction product must be acidified with a strong acid, such as sulphuric or hydrochloric acid, in order to precipitate the free phenoxy-acetic acids, and, under these conditions, the manganese dioxide is rapidly dissolved by reaction with a suitable reducing agent, such as sodium sulphite or ferrous sulphate.

The following examples illustrate how the process of the invention may be carried into effect:

1. A crude approximately 10% by weight solution of sodium 2-methyl-4-chloro-phenoxy-acetic acid in water was treated as follows: To 100 ml. of the solution concentrated hydrochloric acid was added dropwise with agitation until the pH as indicated by test papers was 6.0. The solution was then shaken with 25 ml. of trichlorethylene and the latter run off after separation. This operation was repeated and the aqueous layer then boiled to expel dissolved trichlorethylene. It still had a very strong odour of chlorcresol. 1 gm. of solid potassium permanganate was then added and the solution stirred until all had dissolved. The odour of chlorcresol had entirely disappeared. After filtering off the precipitate of manganese dioxide, an aliquot of the filtrate was treated with excess hydrochloric acid and the precipitate filtered off. After drying, this corresponded to 8.2 gms. per 100 ml. of original solution and had an equivalent weight of 202 (pure 2-methyl-4-chloro-phenoxy-acetic acid has equivalent weight of 200.5).

2. 100 ml. of the crude solution, treated as in Example 1, without extraction, was treated with solid potassium permanganate with agitation, the solid being added in small quantities at five-minute intervals until the odour of chlorcresol had disappeared. 4.7 gms. of potassium permanganate was necessary. The filtrate, on treatment with hydrochloric acid, yielded 8.3 gms. of precipitated acid of equivalent weight 203.

3. A crude product of reaction of sodium chloro-o-cresylate and sodium monochloracetate, diluted to 200 galls. containing approximately 16% by weight of sodium chlorocresoxyacetate, was brought to pH 5.5 by the addition of hydrochloric acid and extracted twice with 50 galls. of trichlorethylene. 19 lbs. of potassium permanganate were then added (the amount found by small scale test to be sufficient to remove the odour of chlorcresol). 15 lbs. of sodium bisulphite were then added and brown oil of vitriol run in slowly with agitation until the pH had fallen to 2.0. The precipitated acid was filtered off and dissolved in water with the addition of caustic soda to give a solution containing 3 lbs. of total solids per gallon having only a slight odour of trichlorethylene.

4. A suspension containing 20% by weight of the crude sodium salt of 2,4-dichlorophenoxy-acetic acid in water was adjusted to pH 5.5 and agitated with the addition of potassium permanganate until the characteristic odour had disappeared. 7% by weight of permanganate was required. 4% by weight of sodium bisulphite was added and, slowly and with agitation, sulphuric acid until pH 2.0 was permanently reached. The precipitated acid was filtered off and dissolved in water with the addition of dimethylene to give a 20% by weight solution having only a slight ammoniacal odour.

What I claim is:

1. A process for the manufacture of derivatives of phenoxy-acetic acid in a substantially odourless condition which comprises treating a not more than slightly acid solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected.

2. A process for the manufacture of derivatives of phenoxy-acetic acid in a substantially odourless condition which comprises treating a neutral solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected.

3. A process for the manufacture of derivatives of phenoxy-acetic acid in a substantially odourless condition which comprises treating an alkaline solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected.

4. A process for the manufacture of derivatives of phenoxy-acetic acid in a substantially odourless condition which comprises extracting a slightly acidified solution of a crude phenoxy-acetic acid derivative selected from the group consisting of crude chloro-phenoxy-acetic acid and salts and esters thereof and crude chloro-methyl-phenoxy-acetic acid and salts and esters thereof with a water-immiscible solvent and treating the partly purified aqueous solution thus obtained with sufficient of a permanganate to remove the odour while leaving the phenoxy-acetic acid derivative substantially unaffected.

5. A process for the manufacture of derivatives of phenoxy-acetic acid in a substantially odourless condition which comprises treating a not more than slightly acid solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected, and separating the precipitate formed from the solution.

6. A process for the manufacture of derivatives of phenoxy-acetic acid in a substantially odourless condition which comprises treating a not more than slightly acid solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected, precipitating a free phenoxy-acetic acid from the purified solution by the addition of acid, separating the precipitate from the solution and redissolving it in alkali.

7. A process for the manufacture of derivatives of phenoxy-acetic acid in a substantially odourless condition which comprises treating a not more than slightly acid solution of a crude phenoxy-acetic acid derivative selected from the group consisting of crude chloro-phenoxy-acetic acid and salts and esters thereof and crude chloro-methyl-phenoxy-acetic acid and salts and esters thereof with sufficient of a permanganate to remove the odour while leaving the phenoxy-acetic acid derivative substantially unaffected, precipitating a free phenoxy-acetic acid from the purified solution by the addition of a strong acid, adding a reducing agent to dissolve the manganese dioxide formed from the permanganate used in the purification treatment, separating the precipitate of free phenoxy-acetic acid from the solution and re-dissolving it in alkali.

GILBERT SPENCER HARTLEY

REFERENCES CITED

The following references are of record in the file of this patent:

UNITED STATES PATENTS

| Number | Name | Date |
| --- | --- | --- |
| 209,978 | Pirz | Nov. 19, 1878 |
| 991,719 | Hoffman et al. | May 9, 1911 |
| 1,815,985 | Pausegran | July 28, 1931 |
| 2,083,856 | Moravec et al. | June 15, 1937 |
| 2,305,103 | Osgood | Dec. 15, 1942 |
| 2,480,817 | Warren | Aug. 30, 1949 |